United States Patent
Inamoto

(10) Patent No.: US 7,576,929 B2
(45) Date of Patent: Aug. 18, 2009

(54) LENS HOLDER, LENS-CENTERING DEVICE AND METHOD OF CENTERING LENS

(75) Inventor: Masayuki Inamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 65 days.

(21) Appl. No.: 11/442,164

(22) Filed: May 30, 2006

(65) Prior Publication Data
US 2006/0274436 A1 Dec. 7, 2006

(30) Foreign Application Priority Data
May 31, 2005 (JP) .............................. P2005-160112

(51) Int. Cl.
*G02B 7/02* (2006.01)
(52) U.S. Cl. ...................................... 359/819
(58) Field of Classification Search .................. 359/819
See application file for complete search history.

(56) References Cited

U.S. PATENT DOCUMENTS

| | | | | |
|---|---|---|---|---|
| 4,936,056 A | * | 6/1990 | Gaudel et al. ............... | 451/390 |
| 5,424,873 A | * | 6/1995 | Uziie et al. .................. | 359/813 |
| 2005/0073755 A1 | * | 4/2005 | Takeo et al. .................. | 359/819 |
| 2005/0152050 A1 | * | 7/2005 | Noda et al. .................. | 359/819 |
| 2006/0049154 A1 | * | 3/2006 | Clifford et al. ......... | 219/121.64 |
| 2006/0077575 A1 | * | 4/2006 | Nakai et al. .................. | 359/819 |

FOREIGN PATENT DOCUMENTS

| JP | 5-36410 U | | 5/1993 |
|---|---|---|---|
| JP | 2001059930 A | * | 3/2001 |

* cited by examiner

*Primary Examiner*—Jessica T Stultz
*Assistant Examiner*—Mahidere S Sahle
(74) *Attorney, Agent, or Firm*—Birch, Stewart, Kolasch & Birch, LLP

(57) ABSTRACT

A method for easily performing of centering operation is provided. A lens holder includes a lens barrel and an optical lens. Plural recessed portions are formed in the outer circumference of the lens barrel at regular intervals circumferentially. The recessed portions are recessed toward an inner circumference having a diameter greater than the outside diameter of the optical lens. When a centering operation is performed, the optical lens is mounted into the lens barrel, and then heated adjusting elements are inserted into the recessed portions from the outer circumference of the lens barrel. Thin-walled portions between the bottom surfaces of the recessed portions and the inner circumference are thermally deformed toward the optical lens and thus pushed against the lens. The amounts of insertion of the adjusting elements are adjusted separately, thus centering the optical lens.

5 Claims, 5 Drawing Sheets

LENS HOLDER, LENS-CENTERING DEVICE AND METHOD OF CENTERING LENS

FIELD OF THE INVENTION

The present invention relates to a lens holder for holding an optical lens inside a lens barrel that has been produced by plastic injection molding using a thermoplastic resin. The invention also relates to a lens-centering device for centering an optical lens held inside a lens barrel molded from a thermoplastic resin and to a method of centering the lens.

BACKGROUND OF THE INVENTION

It has been known from the past that when a lens deviates from the optical axis, the eccentric error induces eccentric aberrations such as on-axis coma (producing a coma on the axis) or blurring on one side (i.e., the positions of foci formed by each off-axis light ray around an image plane are different in the direction of the optical axis) if on-axis light is used. Accordingly, the lenses are temporarily held to holding frames. The frames are mounted in a camera or lens barrel. Then, the eccentric aberrations in the whole lens system are checked. Based on the results, the eccentricities of the lenses from the holding frames can be adjusted.

For example, in the lens-centering mechanism described in JP-UM-A-5-36410, appropriate space is formed between the outer circumference of a lens and the inner circumference of a lens-holding member. Plural adjusting screws are tightened in from the outside of the holding member to bring the front ends of the screws into abutment with the outer circumference of the lens. Thus, the lens and lens-holding frame are temporarily held together. Based on the results of an inspection for eccentricities, the amounts of feeds of the adjusting screws are adjusted to center the lens and to position it. Then, an adhesive is injected through injection holes formed in the holding frames. In this way, the lenses are firmly held to the holding frames.

However, where each lens-holding frame is fabricated with a molding die for plastic injection molding, the die itself is expensive, because minute through-holes such as threaded holes and injection holes are accurately formed from the outer circumference of the lens-holding frame. Furthermore, the protrusions in the molding die for forming the through-holes tend to be easily damaged. There is the disadvantage that the mean time between failures (MTBF) of the die is short.

In addition, there is the danger that burrs are formed on the inside of threaded holes and injection holes in the lens barrel that is a molded product because of variations, for example, caused by environmental variations during molding process. If such burrs are produced, they are removed during assembly and become trash. There is the danger that the trash causes operational trouble or the trash is contained in the final image. Furthermore, when a lens is held to a lens-holding frame, the amounts by which plural adjusting screws are screwed in are adjusted simultaneously. Then, a test for eccentricity is performed. The lens is placed in the optimum position. Under this condition, an adhesive is injected. Therefore, plural screwdrivers for adjusting the adjusting screws and plural injectors for injecting the adhesive into the injection holes must be incorporated in the eccentricity-adjusting device. Consequently, there is the tendency that the eccentricity-adjusting device is increased in size. Furthermore, an operation for screwing in the adjusting screws and an operation for injecting the adhesive are necessary. In this way, laborious working steps have been required.

SUMMARY OF THE INVENTION

An object of an illustrative, non-limiting embodiment of the present invention is to provide a lens holder which (i) makes it possible to economically mold an injection molding die employing a thermoplastic resin, (ii) can be used for a long term, and (iii) does not suffer from deterioration of image quality or operational performance due to burrs that tend be formed on the inside of through-holes. Another object is to provide a lens-centering device that can be miniaturized. A further object is to provide a method of centering a lens easily.

The above-described objects can be achieved by the following means.

In an exemplary embodiment of the present invention, a lens holder has plural recessed portions regularly spaced from each other in the outer circumference of a lens barrel, the recessed portions being recessed from the outer circumference of the lens barrel toward the inner circumference of the lens barrel, the inner circumference having an inside diameter greater than an outside diameter of the optical lens. Thin-walled portions are formed between bottom surfaces of the recessed portions and the inner circumference of the lens barrel. After mounting the optical lens in the lens barrel, the thin-walled portions are thermally deformed toward the optical lens by inserting heated adjusting elements from the outer circumference of the lens barrel into the recessed portions, respectively, to thereby press the thin-walled portions against the optical lens, thus holding the optical lens to the lens barrel. By designing the lens holder in this way, the heated adjusting elements are inserted into the recessed portions when the eccentricity is adjusted. The thin-walled portions are thermally deformed and brought into abutment with the optical lens. The amounts by which the adjusting elements are inserted are adjusted based on the results of an inspection for eccentricity. In this way, the optical lens is adjustably centered. After making the adjustment to achieve an optimum position, heating of the adjusting elements is stopped or the adjusting elements are cooled. Consequently, the thin-walled portions are cured. Thus, the optical lens is held to the lens barrel.

A lens-centering device according to an exemplary embodiment of the present invention comprises: holding means for positioning and holding a lens barrel having an optical lens incorporated therein; and plural adjusting elements inserted from the outer circumference of the lens barrel, which has been heated, in recessed portions regularly spaced from each other circumferentially. The adjusting elements are pressed against the optical lens while thermally deforming thin-walled portions between bottom surfaces of the recessed portions and an inner circumference of the lens barrel toward the optical lens, thus centering the optical lens.

Before or after the optical lens is held to the lens barrel by inserting the adjusting elements into the recessed portions and thermally deforming the thin-walled portions, it may be possible to position the optical lens in the direction of the optical axis by means of positioning means. Where the lens is positioned before being held to the lens barrel, the lens barrel which has been positioned in the direction of the optical axis by the positioning means may be held by the holding means.

According to an exemplary embodiment of the present invention, the recessed portions can be formed at a low accuracy such that the adjusting elements can merely be inserted. Therefore, they can be formed at a lower cost than the molding die for forming a lens barrel provided with accurate through-holes, the molding die having been already described in the "Background Art". Furthermore, it is not necessary to form accurate protrusions inside the molding die. Hence, the recessed portions can be used for a long time. In addition, it is not necessary to form through-holes in the lens barrel and, therefore, after the molding, imaging performance or operating performance is not deteriorated due to burrs or other factor. Additionally, the optical lens is centered by inserting the heated adjusting elements into plural thin-walled portions and thermally deforming the thin-walled portions so as to push against the optical lens. For this reason, no complex and large mechanism is necessary. Consequently, the lens-centering device can be reduced in size. Further, the operation is easy to perform, because it is only necessary to adjust the amounts by which the adjusting elements are inserted.

DETAILED DESCRIPTION OF THE INVENTION

Figure 1:
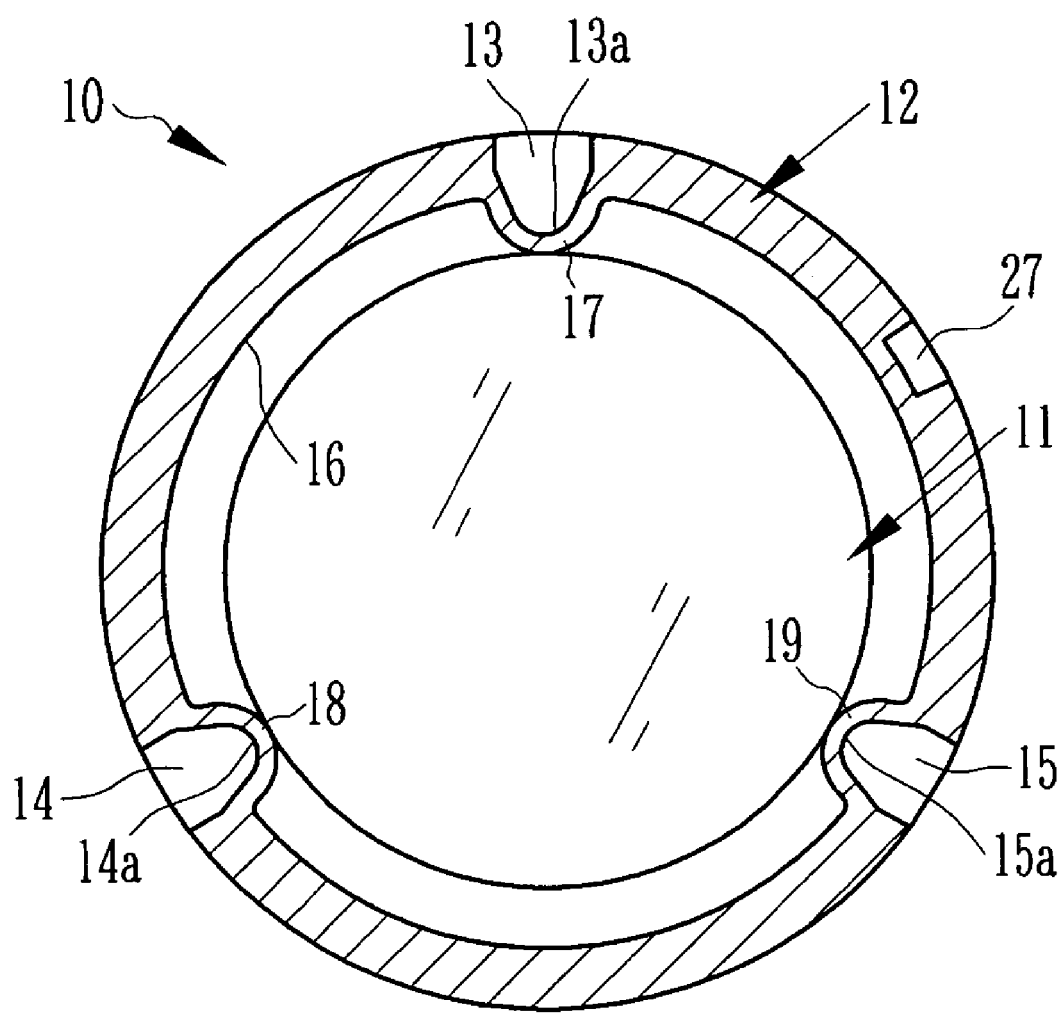
FIG. 1 is a cross-sectional view showing an exemplary embodiment of a lens holder holding an optical lens to a lens barrel.

As shown in FIG. 1, a lens holder 10 includes an optical lens 11 and a lens barrel 12 holding the lens. The lens barrel 12 is provided with recessed portions 13-15 in three positions that are circumferentially equally spaced from each other. The inner circumference 16 of the lens barrel 12 is formed to have an inside diameter greater than the outside diameter of the optical lens 11. Thin-walled portions 17-19 which are located between bottom surfaces 13a-15a of the recessed portions 13-15 and the inner circumference 16 protrude like the letter U toward around the center of the optical lens 11. The front ends of the thin-walled portions abut against the outer circumference of the lens 11, thus holding it.

The lens barrel 12 is made from a thermoplastic resin with an injection molding die. The die includes a cavity, a center core, and plural sliding cores. The center core is a male die forming the inner circumference of the lens barrel 12. The center core can move relative to the cavity along the center axis of a cross section through the lens barrel 12 (i.e., in the direction of the optical axis). The cavity is a female die forming the outer circumference of the lens barrel 12. The sliding cores are mounted in the cavity, and form surfaces constituting the recessed portions 13-15 of the outer circumference of the barrel 12.

Figure 2:
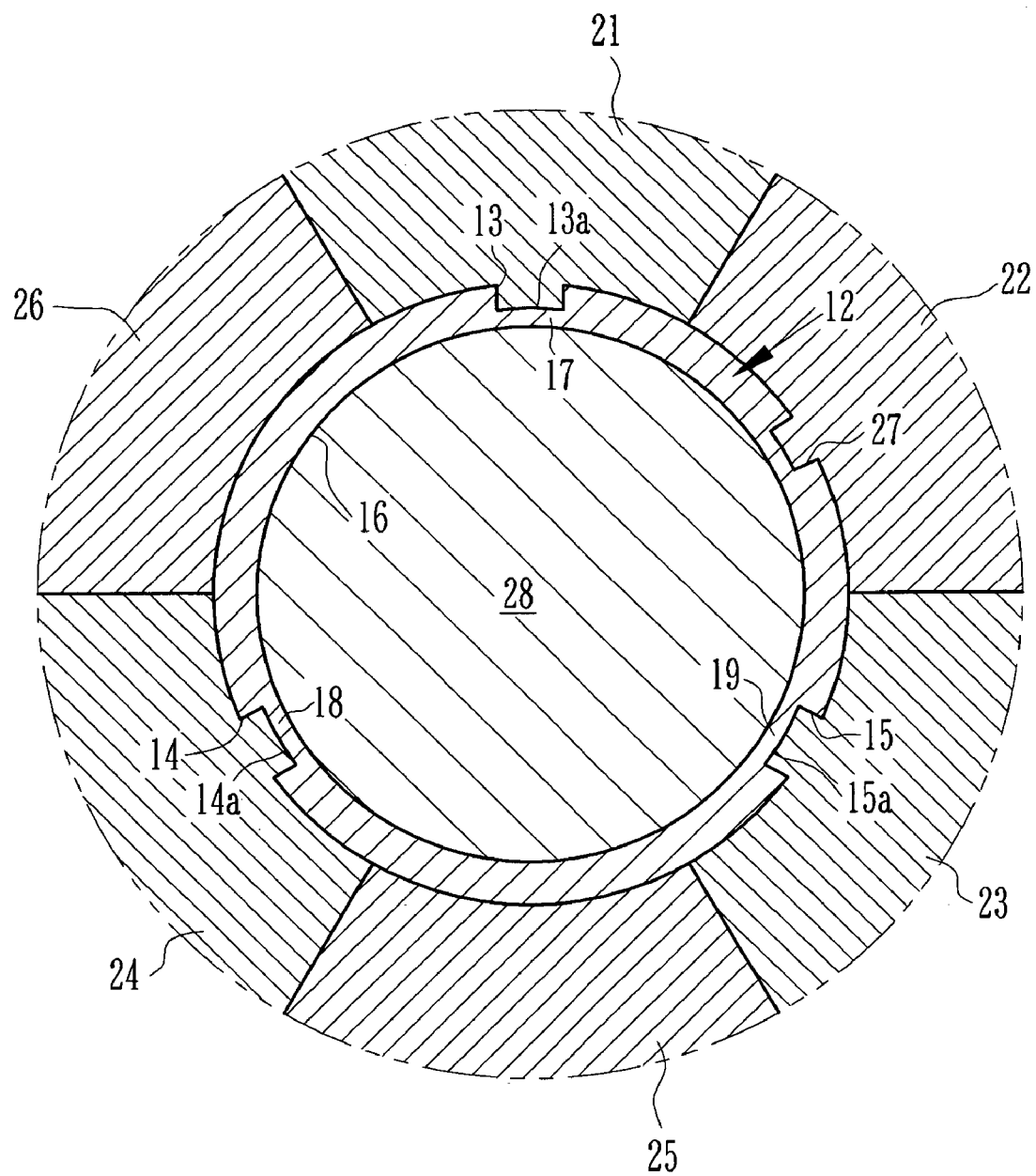
FIG. 2 is a cross-sectional view showing a molding die for molding a lens barrel.

As shown in FIG. 2, the sliding cores 21-26 are mounted slidably radially of the lens barrel 12. Three sliding cores 21, 23, and 24 of the sliding cores 21-26 have the recessed portions 13-15, respectively, in positions which are equally spaced from each other on the outer circumference of the lens barrel 12. The center core is indicated by numeral 28. The thin-walled portions 17-19 between the bottom surfaces 13a-15a of the recessed portions 13-15 and the inner circumference 16 are parts that hold the optical lens 11. The sliding core 22 not associated with the recessed portions 13-15 forms a positioning recessed portion 27 with the adjacent recessed portions 13 and 15. The positioning recessed portion 27 is used for positioning purposes when adjusting elements (described in detail later) are inserted into the recessed portions 13-15 for holding the optical lens 11. The recessed portions 13-15 and positioning recessed portion 27 are circular in contour. The positioning recessed portion 27 is different in diameter from the three recessed portions 13-15.

Figure 3:
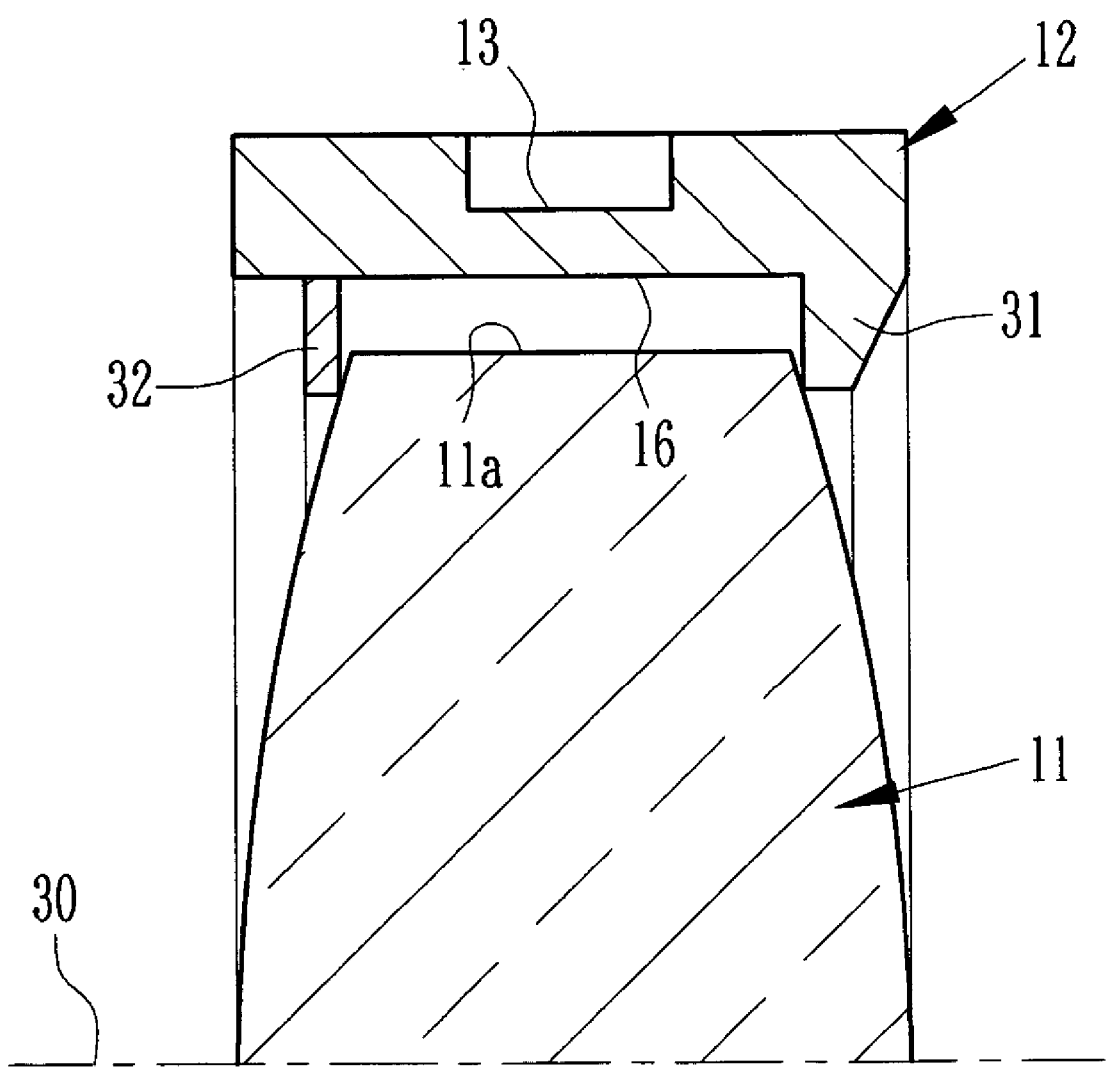
FIG. 3 is a cross-sectional view showing an exemplary state in which the optical lens has been incorporated in the lens barrel and positioned in the direction of the optical axis by a holding ring.

As shown in FIG. 3, a step portion 31 slightly protrudes from the inner circumference 16 of the molded lens barrel 12 inwardly from one direction along the optical axis 30 and is formed in the circumferential direction. The optical lens 11 is inserted into the lens barrel 12 from the other direction along the optical axis 30 until the outer fringes of the lens 11 come into abutment with the step portion 31 while the outer circumference 11a assumes a posture in which it faces the inner circumference 16 of the lens barrel 12. Then, a holding ring 32 is inserted from the same direction as the optical lens 11 to place the lens 11 in position in the direction of the optical axis 30. Also, the optical lens 11 is prevented from coming off the lens barrel 12. The inner circumference 16 of the lens barrel 12 is formed to have an inside diameter greater than the outside diameter of the lens 11. Accordingly, under this condition, the optical lens 11 rattles radially inside the lens barrel 12 although the lens is prevented from coming off. In this state, the holder is sent to an eccentricity-adjusting station, where an eccentricity-adjusting step is performed. The holding ring 32 and step portion 31 together form the positioning means of the present invention.

Figure 4:
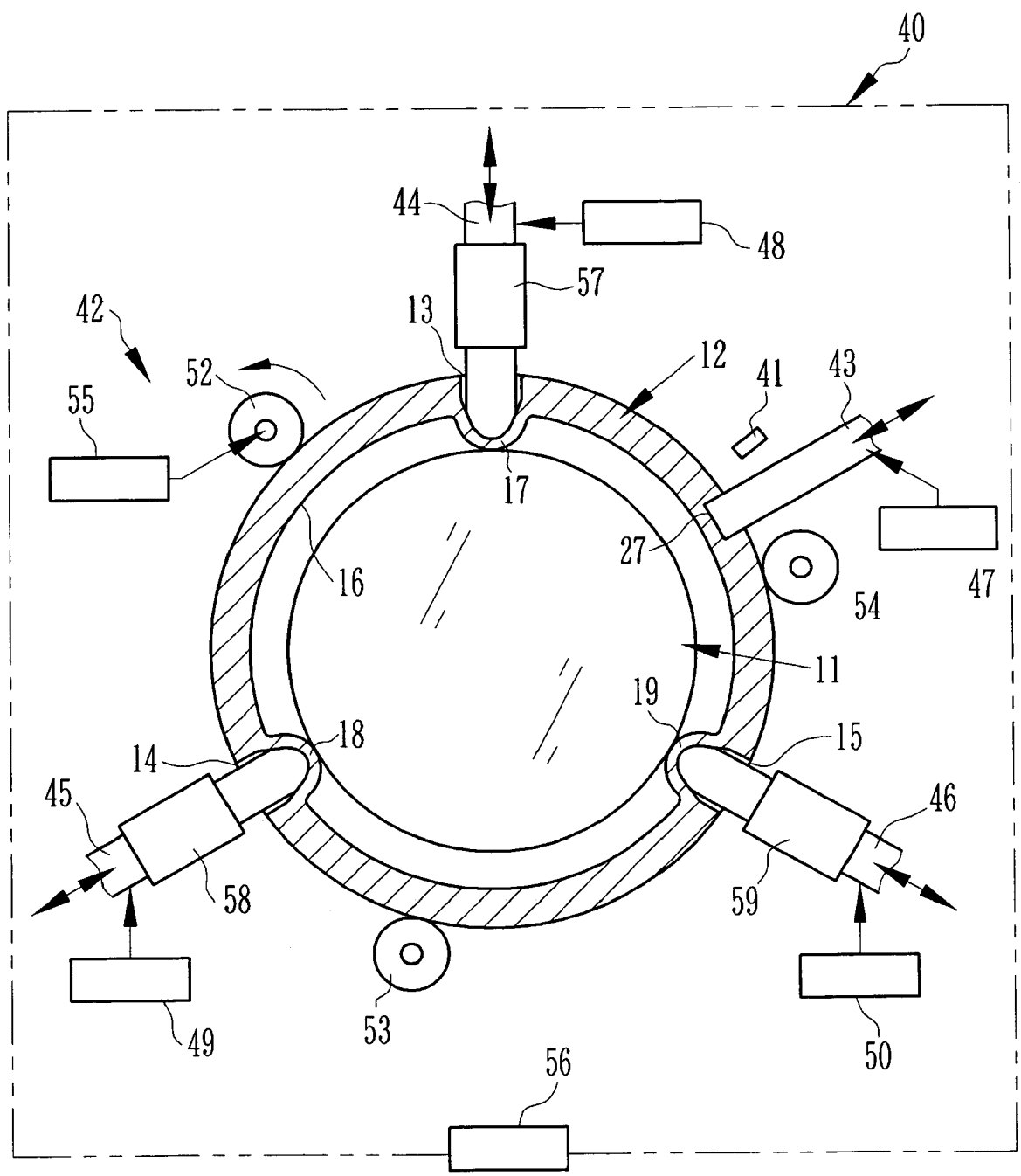
FIG. 4 is a cross-sectional view showing an exemplary manner in which adjusting elements are inserted into recessed portions formed in the lens barrel.

A lens-centering device is disposed in the eccentricity-adjusting station. As shown in FIG. 4, the lens-centering device 40 is made up of a positioning recess detector 41, a lens barrel-rotating mechanism (holding means) 42, a positioning pin 43, three adjusting elements 44-46, moving mechanisms 47-50 for moving the positioning pin 43 and the adjusting elements 44-46, respectively, and a main control portion 56 for controlling the various portions.

The lens barrel-rotating mechanism 42 includes three rollers 52-54 and a drive mechanism 55 for rotating the single roller 52 out of the rollers 52-54 which are circumferentially equally spaced from each other. The lens barrel 12 incorporating the optical lens 11 therein is so set that the three rollers 52-54 are in contact with the outer circumference of the barrel. When a detector (not shown) detects that the lens barrel 12 has been set, the lens barrel-rotating mechanism 42 sends a setting completion signal to the control portion 56. In response to reception of the setting completion signal, the control portion 56 operates the drive mechanism 55 of the lens barrel-rotating mechanism 42, rotating the certain roller 52 in one direction. In this way, the lens barrel 12 is rotated. During this interval, the control portion 56 is monitoring whether the positioning recess detector 41 detects the positioning recessed portion 27. When it is detected, the control portion stops the operation of the drive mechanism 55. Consequently, the lens barrel 12 is placed in an angular position where the positioning recessed portion 27 faces the positioning pin 43. The three adjusting elements 44-46 are placed in given angular positions relative to the positioning pin 43. It is assured that the 3 adjusting elements 44-46 are inserted into the recessed portions 13-15, respectively, by fitting the positioning pin 43 into the positioning recessed portion 27.

The control portion 56 controls the moving mechanism 47 to drive out the positioning pin 43 such that it is fitted in the positioning recessed portion 27. Then, the remaining three moving mechanisms 48-50 are controlled, and the adjusting elements 44-46 are driven out and inserted into the recessed portions 13-15, respectively.

Figure 5:
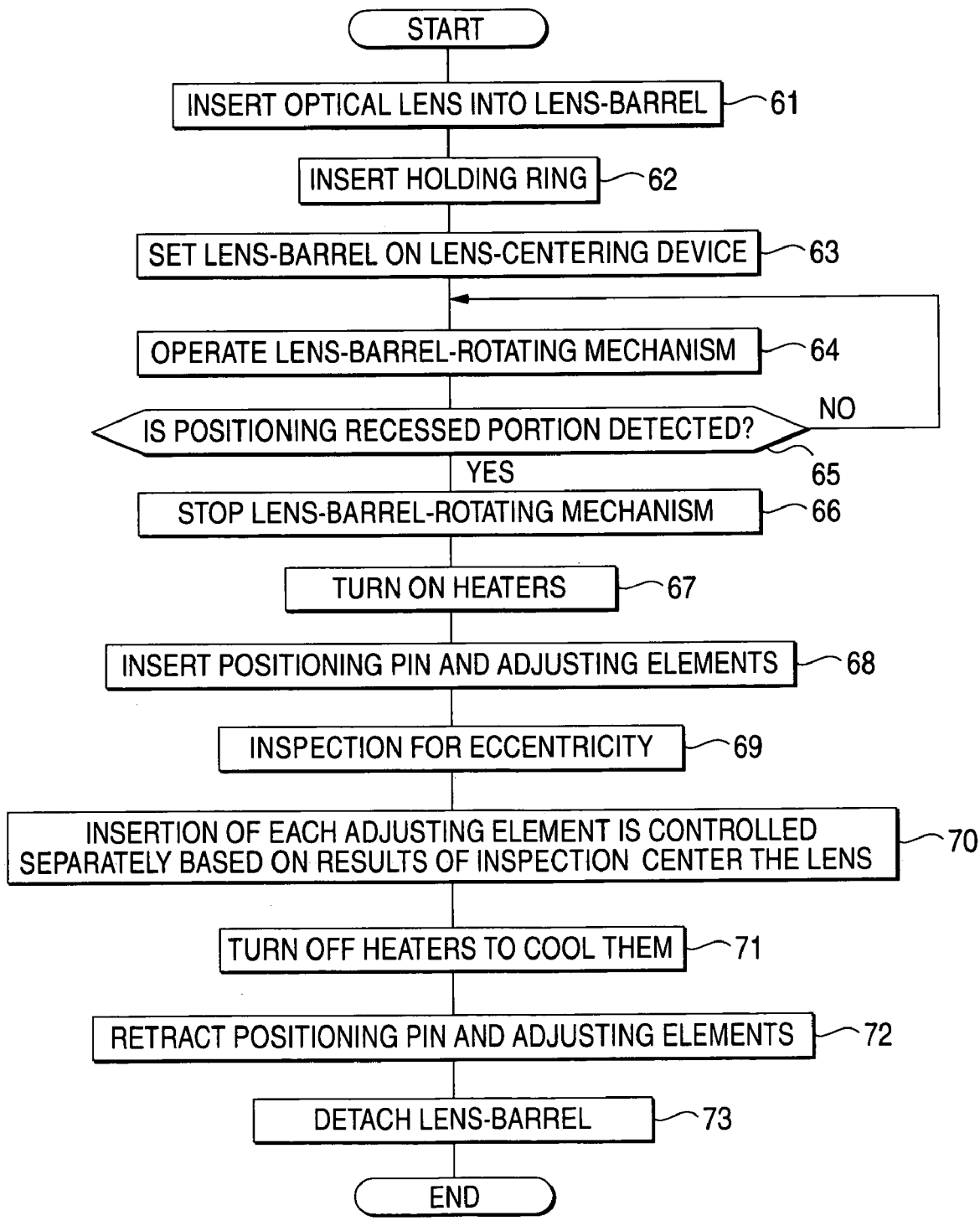
FIG. 5 is a flowchart illustrating an exemplary sequence of operations for adjusting eccentricity.

Heaters 57-59 are mounted to the adjusting elements 44-46, respectively, such that the adjusting elements 44-46 can be heated. The heaters 57-59 are controllably turned on and off by an instruction from the control portion 56. Each heater has an automatic temperature-adjusting function. Because of this function, when the heaters are turned on (energized), the surface temperatures of the adjusting elements 44-46 are maintained at a constant temperature for softening the thermoplastic resin that is the material of the lens barrel 12. As shown in FIG. 5, the heaters 57-59 are turned on before the adjusting elements 44-46 are inserted.

Then, an inspection for eccentricity is performed. This inspection starts with inserting the adjusting elements 44-46 into the recessed portions 13-15, respectively. The amount of insertion obtained at this time gives a reference amount of insertion when the thin-walled portions 17-19 are thermally deformed and their front ends abut against the outer circumference of the optical lens 11. In this way, the optical lens 11 is fixed in a reference position relative to the lens barrel 12. Then, a laser beam is directed along the axis of rotation of the lens barrel 12 at the optical lens 11. The laser beam transmitted through the lens 11 is received. Based on the beam reception position, the amount of eccentricity of the optical lens 11 with respect to the lens barrel 12 is detected. The amount of eccentricity is input to the control portion 56, which in turn controls the three moving mechanisms 48-50 separately based on the amount of eccentricity. In this way, the amounts of insertion of the adjusting elements 44-46 are appropriately adjusted.

With respect to the amounts of insertion of the adjusting elements 44-46, the two adjusting elements 44 and 45, for example, out of the 3 adjusting elements 44-46 are inserted by amounts greater than the amounts of forward or rearward movement found based on the results of the inspection for eccentricity. At the same time, the remaining adjusting element 46 is inserted by an amount less than the reference amount. Alternatively, one adjusting element 46 out of the 3 adjusting elements 44-46 may be inserted by an amount larger than the reference amount and, at the same time, the remaining two adjusting elements 44 and 45 may be inserted by amounts less than the reference amount.

The adjusting elements 44-46 are moved forward and backward independently to adjust the eccentricity while monitoring the laser beam impingement position. When the adjustment of the eccentricity has completed in this way, the U-shaped front ends of the thermally deformed thin-walled portions 17-19 are in abutment with the outer circumference of the optical lens 11.

Then, the control portion 56 turns off the heaters 57-59 for the adjusting elements 44-46 to cool them. After a lapse of a given time since the deenergization of the heaters 57-59, the positioning pin 43 and adjusting elements 44-46 are retracted from the positioning recessed portion 27 and recessed portions 13-15, respectively. If the thermoplastic resin is cured before the adjusting elements 44-46 are retracted in this way, the optical lens 11 can be held. Consequently, the adjusting elements 44-46 can be retracted without hindrance. After retracting the positioning pin 43 and adjusting elements 44-46, the lens barrel 12 is taken out of the lens-centering device 40, thus completing the adjustment of the eccentricity. As a result, the lens holder 10 shown in FIG. 1 is obtained. It is also possible to build a cooling tube in each of the adjusting elements 44-46. During cooling, cooling water may be circulated through the cooling tubes to cool the elements. After the step of adjusting the eccentricity, an adhesive may be injected into the gap between the optical lens 11 and the lens barrel 12 to firmly bond them together.

It is to be understood that the present invention is not restricted in configuration to the embodiments described so far. For example, in the above embodiments, the 3 recessed portions 13-15 are formed. The number of the recessed portions may be in excess of three. In such a case, the recessed portions may be preferably circumferentially equally spaced from each other. Furthermore, in the above embodiments, the lens holder 10 holds the single optical lens 11 to the lens barrel 12. Plural optical lenses may be held to the lens barrel 12. In this case, plural recessed portions may be circumferentially formed in the outer circumference of the lens barrel holding the optical lens.

The shape of the recessed portions 13-15 is not limited to a circular form. It may be elliptical or rectangular. Furthermore, the recessed portions 13-15 may be formed inside a groove that is formed along the whole periphery. In addition, the recessed portions may be formed in positions into which the adjusting elements are inserted, the positions being included in the groove formed along the whole periphery. Additionally, in the above embodiments, the positioning means includes the step portion 31 and holding ring 32. The positioning means is not limited to this structure. The positioning means may include two holding rings. Further, in the above embodiments, the recessed portions are thermally deformed after performing the centering operation, and then the optical lens is held to the lens barrel. The present invention is not limited to this method. The recessed portions may be thermally deformed without performing the centering operation, and the optical lens may be simply held to the lens barrel.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-160112 filed May 31 of 2005, the contents of which is incorporated herein by reference.

What is claimed is:

1. A method of centering an optical lens held inside a lens barrel molded from a thermoplastic resin, the method comprising:
   mounting the optical lens in the lens barrel; and
   inserting heated adjusting elements into recessed portions from an outer circumference of the lens barrel, the recessed portions being regularly spaced from each other in the outer circumference of the lens barrel, so that thin-walled portions between bottom surfaces of the recessed portions and an inner circumference of the lens barrel are thermally deformed to press the thin-walled portions against the optical lens.

2. A lens holder comprising a lens barrel molded from a thermoplastic resin and holding an optical lens therein, and wherein:
   the lens barrel has inner circumference with an inside diameter greater than an outside diameter of the optical lens and is provided with a plurality of recessed portions regularly spaced from each other in an outer circumference of the lens barrel, the recessed portions (1) extending inwardly from the outer circumference of the lens barrel toward an inner circumference of the lens barrel and (2) forming a thin-walled portion at the bottom of each recessed portion; and
   the thin-walled portions protrude inwardly from the inner circumference of the lens barrel and press against an outer edge of the optical lens to position the optical lens within the lens barrel.

3. A lens-centering device for centering an optical lens, the lens-centering device comprising:
- a lens barrel molded from a thermoplastic resin, the lens barrel having an inner circumference with an inside diameter greater than an outside diameter of the optical lens and an outer circumference provided with recessed portions regularly spaced from each other in the outer circumference of the lens barrel, the recessed portions (1) extending inwardly from an outer circumference of the lens barrel toward the inner circumference of the lens barrel and (2) forming a thin-walled portion at the bottom of each recessed portion;
- a holding unit that positions and holds the lens barrel having the optical lens therein; and
- a plurality of heated adjusting elements inserted into and movable within the recessed portions to effect thermal deformation of the thin-walled portions so that the thin-walled portions press against an outer edge of the optical lens.

4. The lens-centering device as recited in claim 3, wherein the thin-walled portions protrude inwardly from the inner circumference of the lens barrel.

5. A method of centering an optical lens held inside a lens barrel molded from a thermoplastic resin, the method comprising:
- mounting the optical lens in the lens barrel; and
- inserting heated adjusting elements into recessed portions that are regularly spaced from each other in an outer circumference of the lens barrel, whereby thin-walled portions between bottom surfaces of the recessed portions and an inner circumference of the lens barrel are thermally deformed and protrude inwardly from the inner circumference of the lens barrel to press against the optical lens.

* * * * *